United States Patent [19]

Hull, Jr. et al.

[11] 3,979,903

[45] Sept. 14, 1976

[54] GAS TURBINE ENGINE WITH BOOSTER STAGE

[75] Inventors: Thomas Neil Hull, Jr.; Robert Evans Warren, both of Marblehead, Mass.

[73] Assignee: General Electric Company, Lynn, Mass.

[22] Filed: Aug. 1, 1974

[21] Appl. No.: 493,506

[52] U.S. Cl. .................... 60/39.09 P; 60/39.09 D; 60/39.23; 55/306; 415/145
[51] Int. Cl.² .................... F02C 7/04; F02K 3/02
[58] Field of Search ............... 60/39.09 P, 39.09 D, 60/39.23, 39.29, 39.07, 226 R; 415/144, 145, 121 A; 55/306, 317, 322

[56] References Cited
UNITED STATES PATENTS

| | | | |
|---|---|---|---|
| 2,672,726 | 3/1954 | Wolf et al. | 60/226 R |
| 2,781,634 | 2/1957 | Moore | 60/226 R |
| 2,931,168 | 4/1960 | Alexander et al. | 60/39.27 X |
| 3,166,989 | 1/1965 | Cowles et al. | 60/39.29 |
| 3,302,395 | 2/1967 | Robbins | 60/39.09 P |
| 3,362,155 | 1/1968 | Driscoll | 60/39.09 P |
| 3,433,244 | 3/1969 | Gardiner et al. | 60/226 R |
| 3,436,910 | 4/1969 | Haworth | 60/39.09 P |
| 3,444,672 | 5/1969 | Alsobrooks | 55/306 |
| 3,514,952 | 6/1970 | Schumacher et al. | 60/226 R |
| 3,832,086 | 8/1974 | Hull et al. | 415/121 G |

FOREIGN PATENTS OR APPLICATIONS

| | | | |
|---|---|---|---|
| 647,632 | 12/1950 | United Kingdom | 60/39.23 |

*Primary Examiner*—C. J. Husar
*Assistant Examiner*—Robert E. Garrett
*Attorney, Agent, or Firm*—Derek P. Lawrence; James W. Johnson

[57] ABSTRACT

A gas turbine engine is provided with a booster stage which operates to increase the power and improve the performance of the engine as well as a particle separator provided at the engine inlet. The booster stage may also eliminate the need for additional anti-icing downstream thereof. The booster is driven at near constant speed by the power turbine of the engine and airflow from the booster is matched to the airflow requirements of the engine by a plurality of variable inlet guide vanes in cooperation with variable bleed means in a manner which maintains the minimum temperature increase of the airflow through the booster required to inhibit ice formation downstream of the booster. In addition, the booster operates to improve the centrifuging effect of the inlet separator, thus eliminating the need for a separate blower for extracting extraneous matter from the collection chamber of the separator.

10 Claims, 4 Drawing Figures

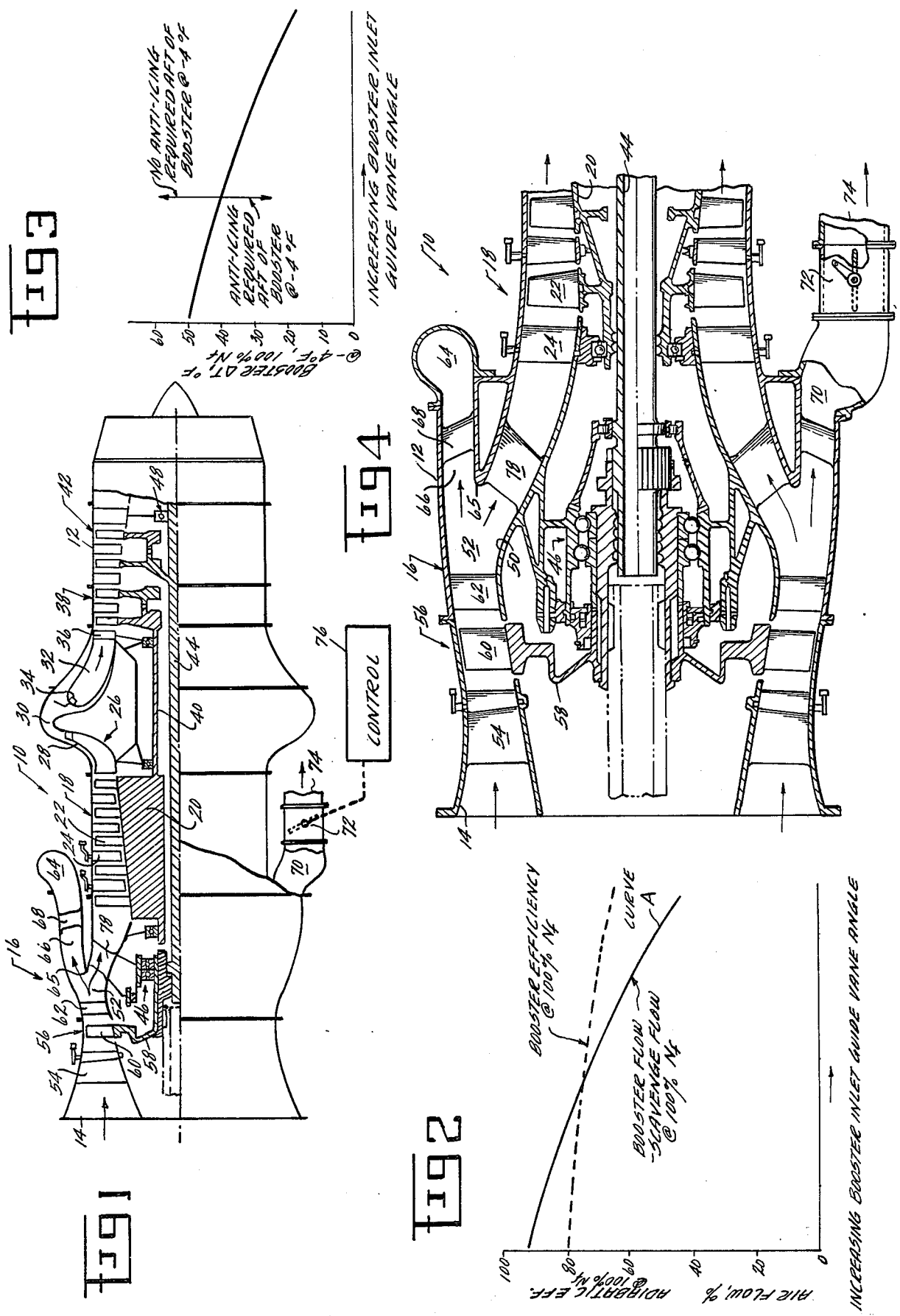

GAS TURBINE ENGINE WITH BOOSTER STAGE

BACKGROUND OF THE INVENTION

This invention relates to a gas turbine engine with booster stage and, more particularly, to a gas turbine engine with booster stage wherein the booster stage may be utilized to provide improved performance for an inlet particle separator and/or anti-icing means for the gas turbine inlet.

Aircraft gas turbine engines are particularly susceptible to damage from foreign objects introduced into the air inlets of the engine. This problem has been most acute in the past with respect to relatively large foreign objects such as stones, birds, hail, ice and the like. With the advent of gas turine powered helicopters and other vertical takeoff and landing VTOL aircraft, smaller particles of foreign matter, such as sand and water, have become increasingly troublesome due primarily to the conditions under which such aircraft may be operated. Because of the VTOL capability, this type of aircraft may be utilized in areas where conventional airfields are nonexistent, such as in combat zones, and in other isolated areas. Helicopters and other VTOL aircraft are also especially suited for certain low altitude missions on both land and sea, including close combat support, search and rescue, and antisubmarine warfare. Under these and related conditions, substantial quantities of small foreign objects, such as sand and dust particles and droplets of water, may become entrained in the airstream supplied to the gas turbine engine. These particles, which individually have little effect on the engine, can cause very substantial damage when introduced into the engine in large quantities. For example, it has been found that the engine of a helicopter operating at low altitude in a desert environment can lose performance rapidly due to erosion of the engine blading by high velocity particles. In addition to erosion, extraneous matter, particularly salt water introduced into the engine in this manner, can cause rapid and destructive erosion.

It is therefore desirable to provide means for separating out the particles of sand, dust, ice, water and the like before the airstream is supplied to the engine. To be satisfactory, it is essential that the separator chosen to provide this function be effective in removing the unwanted particles from the airstream. High efficiency is particularly desirable in an aircraft separator in view of the large quantities of air and, consequently, the large quantities of extraneous particles consumed by a gas turbine engine.

Heretofore, particle separators have included collection chambers which either retained the extraneous matter until the engine was shut down, whereupon the particles were removed through a cleanout port by means of a vacuum hose or, alternatively, remove the particles during engine operation through a single outlet port by means of a blower located in the outlet port. Retaining particles of extraneous matter within the collection chamber of the separator during engine operation is disadvantageous due to the likelihood that particles striking the walls of the collection chamber will eventually be rebounded back into the passageway and hence into the engine inlet. Also, the collection chamber of the separator may fill and overflow into the passageway. Removal of the particles from the collection chamber through a single outlet during engine operation has heretofore required that a separate blower be provided in conjunction with the outlet port to draw out the particles of extraneous matter. Such a blower adds to the overall weight of the engine without increasing engine performance. In addition, conventional particle separators have not included means for preventing ice formations on the interior components thereof wherein the ice components may chip off and enter the engine inlet, damaging the rotating components.

Therefore, it is a primary object of this invention to provide a gas turbine engine with booster stage wherein the booster stage increases the power output and improves the performance of the engine as well as the performance of an inlet particle separator and/or eliminates the need for additional anti-icing means downstream from the booster.

It is also an object of this invention to provide a gas turbine engine with booster stage wherein the booster stage imparts a minimum temperature increase to the airflow therethrough so as to inhibit the formation of ice downstream thereof.

It is a further object of this invention to provide a gas turbine engine with booster stage, wherein the booster stage is driven at near constant speed by the power turbine of the engine and the airflow from the booster stage is matched to the airflow requirements of the engine by a plurality of variable inlet guide vanes in cooperation with variable bleed means in a manner which maintains the minimum temperature differential across the booster stage.

It is an even further object of this invention to provide a gas turbine engine with booster stage and particle separator wherein the airflow exiting from the collection chamber of the particle separator may be modulated so as to match the airflow from the booster with the airflow requirements of the engine.

SUMMARY OF THE INVENTION

The above described objects of this invention are accomplished by providing a gas turbine engine of the type having a compressor, combustor and compressor driving turbine operatively connected in a gas generator, together with a power turbine in downstream serial flow arrangement, with means for reducing the amount of extraneous matter which might otherwise enter the engine. The means include a compressor booster stage drivably connected to the power turbine and in serial flow connection to the inlet of the engine compressor wherein the pressure rise imparted to the airflow through the booster causes a temperature rise in the airflow therethrough, thus inhibiting ice formation downstream from the booster. There may also be included an inlet particle separator in upstream serial flow connection with the compressor inlet wherein the separator includes a row of turning vanes whereby a particle entrained in the airstream and centrifuged by the turning vanes will have both tangential and axial velocity components. A collection chamber is also provided for receiving the particles centrifuged by the turning vanes, and a row of deswirl vanes are provided to remove the circumferential velocity component of the airstream before entering the compressor. The pressure rise imparted to the airflow through the booster stage will increase the centrifuging effect of the separator.

DESCRIPTION OF THE DRAWINGS

While the specification concludes with claims distinctly claiming and particularly pointing out the invention described herein, it is believed that the invention will be more readily understood by reference to the discussion below and the accompanying drawings in which:

FIG. 1 is a cross-sectional view of the gas turbine engine with booster stage of this invention.

FIG. 2 is a graph showing the variation in airflow through the booster stage as a function of the angle of a row of variable angle guide vanes at the engine inlet.

FIG. 3 is a graph showing the variation in differential temperature across the booster stage as a function of the angle of the guide vanes of the graph of FIG. 2.

FIG. 4 is a detailed cross-sectional view of the booster stage of this invention.

DESCRIPTION OF THE PREFERRED EMBODIMENT

Referring to FIG. 1, there is shown a gas turbine engine 10 which has a casing 12 open at one end to provide an annular inlet 14. Downstream of the inlet 14 there is provided an integral inlet particle separator 16 in serial flow upstream relation to an axial flow compressor 18. The compressor 18 may comprise a rotatable drum 20 having a plurality of rows of axially spaced blades 22 extending from the surface of the drum so as to impart a velocity pressure to the air passing thereacross. Axially spaced rows of stator vanes 24 extend radially inward from the casing 12 in interspaced relation between the rotor blades 22. The stator vanes 24 may be of the variable type as is well known in the gas turbine art. A centrifugal compressor 26 may be provided in downstream serial flow relation to the axial flow compressor 18 whereupon the compressed airflow would exit from the compressor 18 through an annular diffuser passageway 28. In this manner the static pressure of the airflow is increased for discharge to a combustion chamber 32.

Fuel is injected into the combustion chamber 32 through a series of fuel nozzles 34, and the resultant mixture ignited to increase the energy level of the gases. Pressurized fuel is supplied to the nozzles 34 from a source which is not shown. The hot gases of combustion are then discharged through a turbine inlet nozzle 36 and through a high pressure compressor driving a gas generator turbine 38, which is connected to drive the compressors 18, 26 through a hollow shaft 40. As is well known in the art, the gas generator portion of the engine 10 consists of the compressors 18, 26, combustor 32 and turbine 38. The hot gases of combustion then pass through a low pressure power turbine 42 which drives a power turbine shaft 44 extending forwardly through the hollow shaft 40 and the compressor drum 20. The power turbine shaft 44 is supported for rotation with respect to the engine 10 by means of a forward bearing 46 and an aft bearing 48 wherein the forward end of the power turbine shaft 44 extends into driving engagement with a suitable speed reduction means (not shown in the drawing). The turbine shaft engine herein described may be suitable for helicopter applications in which a helicopter rotor (not shown) is driven by the power turbine shaft 44 through the speed reduction means.

Turning now to the integral inlet particle separator 16, there is provided an axially extending annular passageway 52 defined generally between the interior surface of the casing 12 and an inner fairing 50. Adjacent the inlet 14 to the passageway 52, there is provided a row of circumferentially spaced, radially extending, variable inlet guide vanes 54 which function in a manner to be made obvious from the following discussion. In downstream serial flow relation to the inlet guide vanes 54, there is provided a compressor booster stage 56 comprising a rotor disc 58 connected for rotation with the power turbine shaft 44 together with a row of circumferentially spaced apart radially extending blades 60 disposed about the periphery of the rotor disc 58. Adjacent the booster stage 56 there is provided a row of circumferentially spaced apart radially extending turning vanes 62 having a desired turning configuration which will be described presently. Downstream from the turning vanes 62 there is provided an annular particle collection chamber 64 which receives a portion of the flow from the passageway 52 through an annular extraction slot 66. In general co-planar alignment with the extraction slot 66 there is provided a compressor inlet 65 for receipt of an inlet airflow to the compressor 18 from the passageway 52. Between the extraction slot 66 and the particle collection chamber 64 there is provided a plurality of circumferentially spaced apart scroll scavenging vanes 68 which function in a manner as fully disclosed in co-pending U.S. Pat. application, Ser. No. 351,622. Means for ducting the extraneous matter from the collection chamber 64 are provided by a scavenge duct 70 which communicates with the chamber 64 and preferably extends initially in a tangential direction curving gradually rearward from the chamber 64 so as to terminate in a modulating flow control valve 72. The scavenge flow exits from the control valve 72 through a rearwardly directed discharge nozzle 74 wherein the rate of flow through the valve 72 is modulated by a control 76 as a function of the speed of the gas generator.

The control 76 may be any suitable variable stator engine control system of the type well known in the art which is capable of controlling the angle of the valve 72 as a function of gas generator speed. One such control system is disclosed in U.S. Pat. No. 2,931,168. Adjacent the compressor inlet 65 there is provided a row of circumferentially spaced apart radially extending deswirl vanes 78.

During operation of the gas turbine engine 10 the low pressure area existing at the inlet 65 to the compressor 18 in conjunction with the rotation of the blades 60 of the booster stage 56 cause air to flow through the passageway 52 at a high velocity. As the air passes over the stationary turning vanes 62, it is turned or centrifuged circumferentially such that downstream of the vanes 62 the airstream has both angular and axial velocity. This is known as imparting swirl to the fluid stream. Small particles of foreign matter entrained in the airstream are also centrifuged, this centrifuging resulting primarily from the particles, which have small mass, being carried along with the swirling air. To assure that particles having greater mass are also centrifuged by turning vanes it may be desirable to overlap adjacent vanes circumferentially so that a particle cannot pass axially between adjacent vanes without striking a vane and thereby being turned. A particle entrained in the airstream and centrifuged will have both tangential and axial velocity dowstream of the turning vanes 62. In theory, a particle leaving the vanes 62 with both tangential and axial velocity, and not being subject to any external forces, will follow a straight line path to the outer periphery of the passageway 52 at some point downstream of the vanes 62. In practice, however, the swirling air has a significant effect on the particles' trajectory which can be compared roughly to that of a helix having increasing diameter in the downstream direction. The deswirl vanes 78 operate to remove the circumferential velocity component of the airstream before entering the compressor 18.

In the preferred practice of the present invention, the turning vanes 62 have a turning configuration which will cause the entrained extraneous matter to reach the outer periphery of the passageway 52 and then either flow directly into the collection chamber 64 or strike the interior surface of the separator and rebound therefrom into the chamber 64. Once the particles enter the chamber 64, they are prevented from rebounding back into the passageway 52 and hence to the engine inlet by the scroll scavenging vanes 68 which maintain the same circumferential direction of flow initially imparted to the input airstream by the turning vanes 62. As becomes readily apparent, once a particle travels aft of the scroll scavenging vanes 68 into the collection chamber 64, nearly all possible rebound paths back into the compressor inlet 65 are blocked by the scroll scavenging vanes. The airflow exits from the collection chamber 64 through the duct 70 whereupon the airflow may be either dumped overboard or used for such various purposes as infrared suppression, engine bay cooling, engine oil cooling, or aircraft oil cooling.

As previously discussed, the rate of airflow through the modulating flow control valve 72 may be controlled as a function of gas generator speed in a manner to be fully described in the following discussion. It will be readily appreciated that the booster stage 56 can be made sufficiently rugged to withstand erosion as well as most types of foreign object damage as can be expected from normal operation of the engine. Thus the booster stage can be designed as an integral component of the gas turbine engine 10 wherein the pressure rise imparted to the airflow through the booster stage eliminates the need for an additional scavenge blower as would normally be required for a particle inlet separator of the type herein described. In addition, the increased pressure imparted to the airflow by the booster stage 56 makes possible the use of a smaller collection chamber, thus reducing the overall weight of the engine. The booster also increases the engine cycle pressure ratio, thus increasing the power output and performance of the engine.

As is well known, the power turbine in a helicopter gas turbine engine generally operates at a constant speed during all modes of flight operation while the gas generator turbine may operate from approximately 70% to 100% of its maximum rated speed. Thus the airflow requirements to the compressor 18 may vary in accordance with the curve A of FIG. 2 wherein the ordinate is calibrated to represent the percentage of maximum airflow required for the gas generator assuming that the power turbine 42 operates at 100% of its maximum rated speed. In order to meet the variable airflow requirements of the gas generator, it is necessary that the airflow through the booster stage 56, which is driven by the power turbine at a constant speed, be varied to match the inlet airflow requirements of the compressor 18. One means of varying the airflow through the booster stage 56 is provided by the variable inlet guide vanes 54, the angle of which may be adjusted in accordance with the abscissa of the graph of FIG. 2 so as to achieve the variation in airflow through the booster stage 56 required to match the inlet airflow requirements of the compressor 18. The variable inlet guide vanes 54 may be controlled in a well known manner in accordance with variations in the gas generator speed, thus matching the airflow characteristics of the booster 56 to that of the axial flow compressor 18.

Any suitable variable stator engine control system of the type well known in the art may be provided to control the position of inlet guide vanes 54 in accordance with the gas generator speed. One such control system suitable for this purpose is disclosed in U.S. Pat. No. 2,931,168.

It is also advantageous that the pressure rise in the airflow through the booster stage 56 remain sufficiently high to impart at least a 40°F temperature rise to the airflow therethrough so as to eliminate the need for providing any means of anti-icing downstream of the booster stage. In this manner the turning vanes 62 and deswirl vanes 78 need not be provided with an anti-icing airflow as would otherwise be required. However, the booster pressure ratio as well as the temperature rise across the booster stage decrease as the angle of the inlet guide vane in increased, as shown in the graph of FIG. 3 where the ordinate is calibrated in terms of the differential temperatures across the booster stage with the abscissa calibrated in terms of the angle through which the inlet guide vanes vary. The curve of FIG. 3 represents a gas turbine engine operated in a −4°F. ambient temperature wherein the speed of the power turbine remains constant at 100% of its maximum rated value. As becomes readily apparent by comparing the graph of FIG. 2 with that of FIG. 3, if the inlet guide vane angle should exceed a value where the temperature rise across the booster is less than 40°F. on a −4°F. day additional anti-icing means will be required. For days warmer than −4°F, a smaller temperature rise through the booster will be required for anti-icing.

In order to maintain the minimum temperature differential of 40°F. across the booster stage, the gas turbine engine of this invention provides for the variation of the inlet guide vane angle only through that range where the minimum temperature differential is exceeded. Should the inlet airflow requirements for the gas generator decrease below a level at which the minimum temperature differential of 40°F. across the booster stage can be maintained, then the valve 72 will be controlled as a function of the gas generator speed to modulate the airflow bled from the collection chamber 64 in a known manner, thus matching the airflow between the booster and compressor stages. In this manner the angle of the inlet guide vanes need not be varied to a value which would cause the temperature differential across the booster stage to decrease below the minimum value required to prevent components downstream of the booster from icing. As will be readily understood, the valve 72 could be modulated to regulate the airflow through the booster stage for the entire range of engine operation, thus eliminating the variable inlet guide vanes entirely. However, this would prove inefficient due to the increased loss of compressed airflow in the range of engine operation where the airflow through the booster stage is greatest. Thus, the improved efficiency of the gas turbine engine of this invention is achieved by utilizing the variable inlet guide vanes to regulate the airflow through the booster stage 56 to match the inlet airflow requirements of the compressor only for so long as the temperature increase across the booster stage remains above a minimum value for safe operation without risk of components downstream from the booster stage icing. For the mode of operation, where the ambient temperature poses a risk of icing, and the angle of the inlet guide vanes would have to be varied outside the range required for maintaining the minimum temperature differential across the booster stage, it is then necessary that the airflow through the booster stage be modulated by the modulating control valve 72 in accordance with changes in the gas generator speed. The change in mode of operation for varying the airflow through the booster stage by either the variable inlet guide vanes 54 or the modulating flow control valve 72 may be accomplished automatically by sensing ambient temperature or through a pilot actuated control signal. The modulating flow control valve 72 may also be used in a conventional manner to minimize the occurrence of surge and/or other stall conditions in the compressor as well as other aero-elastic problems associated with flow transients.

Accordingly, while a preferred embodiment of the present invention has been depicted and described, it will be appreciated by those skilled in the art that many modifications, substitutions and changes may be made thereto without departing from the invention's fundamental theme. For example, the booster stage 56 may be utilized in conjunction with the modulating flow control valve 72 without a particle collection chamber 64 to provide the same anti-icing capability. In that instance, the airflow from the booster stage 56 would again be matched to the inlet airflow requirements of the compressor 18 by the variable inlet guide vanes in cooperation with the airflow bled by the modulating flow control valve 72. In such an arrangement, the swirl and deswirl vanes 62, 78 would, of course, not be required. Thus, having described the preferred embodiments of the invention, though not exhaustive of all possible equivalents, what is desired to be secured by Letters Patent is claimed below.

What is claimed is:

1. In a gas turbine engine having a compressor, combustor and compressor driving turbine operatively connected in a gas generator, together with a power turbine in downstream serial flow arrangement, there is also provided means for reducing the amount of extraneous matter which might otherwise enter the engine and improving the performance of the compressor, said means comprising:
   a compressor booster stage drivably connected to the power turbine;
   a particle separator having an inlet in downstream flow communication with the booster, said inlet having stationary turning vane means disposed therein for centrifuging the air exhausted from the booster, whereby a particle entrained in the airstream centrifuged by the turning vane means will have both tangential and axial velocity components;
   collection chamber means for receiving the particles centrifuged by the turning vane means;
   a row of variable angle inlet guide vanes in upstream serial flow relation to the booster stage;
   a scavenge duct communicating with the collection chamber and terminating in a modulating flow control valve wherein the airflow exits from the particle collection chamber through the duct and modulating flow control valve;
   wherein the inlet to the gas generator compressor is disposed downstream of the turning vane means so as to receive the centrifuged air flowing therefrom, and includes deswirl vane means for removing the circumferential velocity component of the airstream entering the gas generator compressor whereby the pressure rise imparted to the airflow through the booster stage increases the centrifuging effect of the separator as well as the power and performance of the engine, and
   wherein the compressor booster stage is driven at a substantially uniform speed.

2. The gas turbine engine of claim 1 further comprising:
   means for controlling the angle of the inlet guide vanes as a function of gas generator speed, and
   means for controlling the angle of the modulating flow control valve as a function of gas generator speed.

3. The gas turbine engine of claim 2 wherein:
   the means for controlling the angle of the inlet guide vanes matches the characteristics of the airflow from the compressor booster with that of the gas generator in a range of engine operation within which the pressure rise in the airflow through the booster in maintained sufficiently high to impart a minimum temperature increase to the airflow therethrough, and
   the means for controlling the angle of the modulating flow control valve matches the characteristics of the airflow from the compressor booster, with that of the gas generator in a range of engine operation within which further matching of the characteristics of the booster airflow with that of the gas generator by controlling the inlet guide vane angle would cause the pressure rise in the airflow through the booster to be insufficient to impart said minimum temperature increase.

4. The gas turbine engine of claim 3 wherein the particle separator includes: an annular passageway defined generally between the interior surface of an outer casing and an inner fairing between which the turning vanes extend in a generally radial direction, an annular extraction slot for receiving a portion of the airflow in the passageway from whence the airflow is directed to the collection chamber, and a plurality of circumferentially spaced apart scroll scavenging vanes disposed between the extraction slot and particle collection chamber for maintaining the same circumferential direction of flow initially imparted to the input airstream by the turning vanes so as to block nearly all possible rebound paths back into the passageway.

5. The gas turbine engine of claim 4 wherein the compressor booster stage includes: a rotor disc disposed between the variable inlet guide vanes and turning vanes, said disc being connected for rotation with the power turbine through an interconnecting power turbine shaft, and a row of circumferentially spaced apart blades disposed about the periphery of the rotor disc which radially extend toward but are spaced apart from the outer casing.

6. In a gas turbine engine having a compressor, combustor and compressor driving turbine operatively connected in a gas generator together with a power turbine in downstream serial flow arrangement, there is also provided means for reducing ice formation comprising:

a compressor booster stage drivably connected to the power turbine in upstream serial flow relation to the compressor inlet, a plurality of variable angle inlet guide vanes in upstream serial flow relation to the booster stage, variable bleed means for bleeding a portion of the airflow from between the booster stage and compresor inlet, means for controlling the angle of the variable guide vanes as a function of gas generator speed so as to match the characteristics of the airflow from the compressor booster with that of the gas generator in a range within which the pressure rise in the airflow through the booster remains sufficiently high to impart a minimum temperature increase to the airflow therethrough in order to inhibit ice formation downstream from the booster, and means for controlling the amount of airflow bled from between the booster and compressor as a function of gas generator speed so as to match the characteristics of the airflow from the booster with that of the gas generator in a range within which further matching of the characteristics of the airflow from the compressor booster with that of the gas generator by controlling the inlet guide vane angle would cause the pressure rise in the airflow through the booster to be insufficient to impart said minimum temperature increase.

7. The gas turbine engine of claim 6 including a particle separator having an inlet in upstream serial flow arrangement with the compressor inlet wherein the separator includes turning vane means for centrifuging the air exhausted from the booster whereby a particle entrained in the airstream and centrifuged by the turning vane means will have both tangential and axial velocity components, collection chamber means for receiving the particles centrifuged by the turning vanes and deswirl vane means for removing the circumferential velocity component of the airstream before entering the compressor whereby the pressure rise imparted to the airflow through the booster stage increases the centrifuging effect of the separator.

8. The gas turbine engine of claim 7 wherein the bleed modulating means includes:

annular extraction slot means for receiving a portion of the airflow from the booster and directing that airflow to the collection chamber means, a scavenge duct communicating with the collection chamber means and terminating in a modulating flow control valve wherein the airflow exits from the particle collection chamber means through the duct and modulating flow control valve, and means for controlling the modulating flow control valve as a function of gas generator speed to modulate the airflow bled from the collection chamber means so as to match the characteristics of the airflow from the compressor booster with that of the gas generator in that range of operation within which the pressure rise in the airflow through the booster would be insufficient to impart said minimum temperature rise.

9. The gas turbine engine of claim 6 wherein the compressor booster stage includes:

a rotor disc disposed between the variable inlet guide vanes and compressor inlet, said disc being connected for rotation with the power turbine through an interconnecting power turbine shaft, and a row of circumferentially spaced apart radially extending blades disposed about the periphery of the rotor disc.

10. A method of separating the particles entrained in the air ingested by, while simultaneously improving the performance of, a gas turbine engine of the type which includes an inlet supplying air through variable guide vanes to a booster, particle separator and gas generator in downstream serial flow relation comprising the steps of:

rotating the booster at a substantially uniform speed, centrifuging any particles entrained in the booster airflow by directing the booster airflow through a plurality of turning vanes, collecting centrifuged particles in a collection chamber disposed downstream of the turning vanes, deswirling the centrifuged air exiting from the booster by directing the booster air through a plurality of deswirl vanes to the gas generator, varying the inlet guide vane angle as a function of gas generator speed to match the characteristics of the booster airflow with that of the gas generator in a range within which the pressure rise in the airflow through the booster remains sufficiently high to impart a minimum temperature increase thereto, to thereby inhibit ice formation downstream of the booster, bleeding a portion of the booster airflow through a scavenge duct in flow communication with the collection chamber and terminating in a flow control valve, varying the position of the flow control valve as a function of gas generator speed so as to match the characteristics of the airflow from the booster with that of the gas generator in a range within which further matching of the characteristics of the airflow from the compressor with that of the gas generator by controlling the inlet guide vane angle would cause the temperature rise in the airflow through the booster to fall below the minimum temperature.

* * * * *